Oct. 27, 1936.    W. F. KAMMER    2,058,591
CURRENT MOTOR OPERATED PUMP
Original Filed March 28, 1935
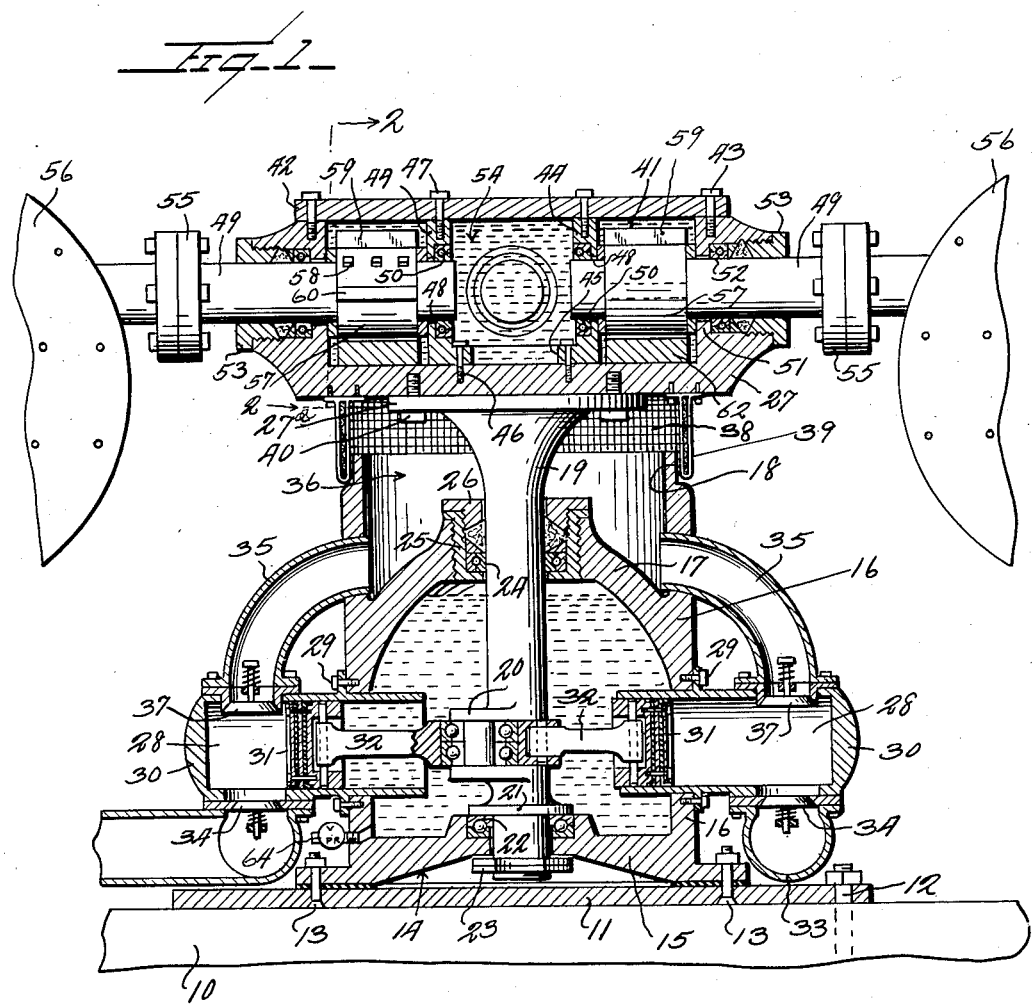

Patented Oct. 27, 1936

2,058,591

UNITED STATES PATENT OFFICE 2,058,591

CURRENT MOTOR OPERATED PUMP

William Frank Kammer, Wenatchee, Wash.

Original application March 28, 1935, Serial No. 13,547. Divided and this application December 3, 1935, Serial No. 52,695

3 Claims. (Cl. 103—174)

This invention relates to current motors, particularly to motors of this character having feathering blades, and is a division of my pending application, Serial No. 13,547, filed March 28, 1935.

The general object of this invention is to provide a current motor of this character which has been found to be particularly effective in generating power, in which friction is reduced to a minimum, and which is adapted particularly to be disposed on the bed of a stream either permanently or whenever desired to use it.

A further object is to provide a construction of this character which is particularly adapted for use as a pumping unit.

Another object is to provide a rotative screen for screening the water passing to the pump cylinders and preventing passage of debris into the pump cylinders, the screen being rotative in order to prevent clogging.

Other objects have to do with the details of construction and arrangement of parts as will more fully appear hereinafter.

My invention is illustrated in the accompanying drawing, wherein:—

Figure 1 is a side elevation of a current motor constructed in accordance with my invention;

Figure 2 is a vertical sectional view through the motor on the line 2—2 of Figure 1, the blades being omitted.

Referring to the drawing, 10 designates a skid or skids upon which the base 11 of the current motor is mounted, this base being held to the skids by bolts 12, or other suitable means. Engaged by bolts 13 with this base is the main casting 14 of the pump base. This casting has a lower annular portion 15 provided with the annular wall 16, and intermediate the height of this annular wall there is an annular inwardly and upwardly extending flange 17 formed with a bearing at its center for the insertion of the central driving shaft. The wall 16 at its upper end is recessed at 18 for the reception of a screen, which will be later described.

Extending downward through the upper and lower bearings of the base is a crank shaft 19 provided adjacent its lower end with a crank 20. The lower end of this crank shaft is provided with a step 21 resting upon ball bearings or other anti-friction bearings 22 and held in place by nuts and washers 23, or equivalent means. The upper end of the annular flange 17 is provided with a stuffing box and packing gland for the retention of the ball bearings 24, the ball bearings being retained in place by the annular ball-bearing retainer 25 screwed into place. The packing gland is designated 26. The upper end of the shaft 19 is expanded to form a supporting disk or plate 27a upon which the head, designated generally 27, is mounted. This head will be later described.

Extending through the wall 16 adjacent the lower end thereof are a plurality of cylinders each designated 28. These cylinders are alike and are shown as being held to the wall 16 by the cap screws 29 or equivalent means. The outer end of each cylinder is closed at 30. The inner end is open, and operating in these cylinders are the pistons 31 having the rods 32 connected operatively to the crank 20 by ball-bearings. It will be seen that with this construction when one piston is forced outward, the other piston is retracted. While I have only shown two of these pistons and two cylinders, I wish it to be understood that I am not to be limited to this number as more than one pair of cylinders may be used, there being proper cranks, of course, formed upon the shaft 19 for this purpose.

Extending circumferentially around the base 14 is a collector pipe 33 which opens into the several cylinders, the ports leading from the cylinders into the collector pipe being controlled by means of the check valves 34 which may be of any suitable or usual construction. These check valves are so designed that as the piston moves outward the liquid in the cylinders will be forced into the collector 33 and the check valves closed when the piston is retracted. Each cylinder is provided with an inlet port directly opposite the outlet port leading to the collector, and from this inlet port there is a duct 35 which opens into the chamber defined by the wall 16 and by the upwardly and inwardly extending wall 17, this chamber being designated 36.

A check valve 37 of any usual or suitable construction is provided at the junction of the duct 35 with each cylinder for the purpose of permitting the inlet of liquid into the cylinder but preventing its outlet through the duct 35. I do not wish to be limited to the particular construction shown whereby the duct 35 is connected to the cylinder wall or whereby the check valve is mounted, as this may be obviously varied in many ways without departing from this invention, as hereinafter defined in the claims.

Of course, the collector 33 is provided with a delivery pipe leading to any desired point and from which the water from the collector is discharged.

For the purpose of screening the water which passes from the river or stream into the chamber 36, I provide the screen 38 which is mounted upon and for rotation with the head 28, the lower end of this screen overlapping the face of the recess 18, the screen being supported at intervals by the supporting members 39.

The plate 27a has a flat upper surface which rests against the head 27 and is held thereto in any suitable manner, as for instance, by the screws 40. The interior of the head is hollow to provide an annular chamber 41, and the top of the head is closed by means of a plate 42 held to the body of the chamber by screws 43. A central many-sided chamber or compartment is formed by the wall 44, this wall having an interior flange 45 through which screws 46 pass to hold the wall in engagement with the bottom plate of the head 28. Screws 47 may also extend downward through the top plate 42 into this wall 44. The inner face of this wall is formed with a plurality of openings 48 for the passage of the blade shafts 49, and the wall 44 carries ball-bearings or other anti-friction bearings 50 for these blade shafts 49. The exterior wall 51 of the chamber 41 is also provided with ball-bearings 52, and with suitable stuffing boxes and packing glands, designated generally 53 holding the ball-bearings in place and preventing the passage of liquid.

I have illustrated four shafts 49, and hence the central chamber 54 defined by the wall 44 is shown as being square in cross section, but it is to be distinctly understood that more than four shafts 49 might be used, and thus the chamber 54 will have a cross section depending entirely upon the number of shafts 49 which may be used. The number of blade shafts 49 which will be used will depend upon the power desired and the circumstances of operation.

The outer ends of each of the shafts 49 is provided with a flange 55 apertured for the passage of screws or bolts to which the paddles or blades 56 may be attached.

The particular construction of the paddles is illustrated in detail in my pending application, Ser. No. 13,547 heretofore referred to, and it is sufficient to say that these paddles, as shown in the drawing at 56, are eccentric to the shafts 49 and that the paddles are buoyant so that when a blade starts on its downstream travel, the blade will be lowered to a vertical position by one of the stops 59 or 60 bearing against the abutment 62 or 63. When the blade reaches the full limit of its travel downstream and moves upstream, the buoyancy of the blade will cause it to turn into a feathering position and it will move upstream in this position.

As before mentioned, this machine is designed to be disposed on the river bottom, and it may be pulled in or out of the river for servicing.

It may be mounted on any suitable means for this purpose, as for instance, a stone boat or sled, or it may be mounted on a truck carried on wheels which would run into the river a sufficient depth to submerge the unit. Because of the fact that the unit sits on the river bottom below the surface of the river, there is no danger of floating debris damaging the blades.

It is intended that the chamber defined by the portions 15, 16 and 17 shall be filled with oil to thus reduce friction as much as possible. A small pressure relief valve 64 may be disposed in the base to take care of any pressure developed by water which might seep past the shaft. Water being heavier than oil will go to the bottom and the oil level which will be within one inch of the top when filled, will naturally be forced up filling the upper portion of the casting or base, while the water will find its level and pass out through the outlet or relief valve in the base. The thrust nut and lock nut designated 23 in the drawing takes up any up-and-down thrust. The lower ball-bearing 22 carries the vertical load of the power head and the crank shaft.

The lower chamber enclosing the cranks 20 may be filled with oil from any inlet opening closed by a plug.

While I have illustrated certain preferred details of construction, I do not wish to be limited to these except as defined in the appended claims as many minor details may be changed to suit various circumstances of operation without departing from the spirit of the invention.

Attention is particularly called to the fact that the screen 38 is rotatable with the shaft 19 and head 27. This is so as to prevent the screen from clogging. By making it rotatable, particles which are forced against the exterior face of the screen will be swept away as the screen rotates and thus the screen will be kept free of any debris which would tend to clog it. Thus a maximum area of opening is left for water to supply the pump cylinders and there is no danger of detritus getting into the cylinders through the inlet pipes and possibly preventing the closing of the valves or otherwise damaging the apparatus.

What is claimed is:—

1. A structure of the character described, including a casing constituting a base and having a plurality of radial cylinders carried thereby, a vertical shaft mounted in bearings in said base and having a crank, pistons connected to said crank and operating in said cylinders, each of said cylinders having adjacent its outer end an inlet port and an outlet port, a collecting element mounted upon the base and into which all of said outlet ports from the cylinders open, check valves in said ports controlling the passage from the cylinders, the upper end of said casing being formed to provide a water chamber, ducts leading from said water chamber to the inlet ports of the cylinders, check valves controlling the inlet of water from said ducts to the cylinders, a motor operated power head carried upon the upper end of the shaft and rotatable therewith, and a screen carried by said power head and rotatable around the wall of said chamber whereby water may be admitted to said chamber.

2. A submersible pump of the character described, comprising a hollow body, cylinders extending radially through the wall of the hollow body and closed at their outer ends, a shaft extending vertically through the body and mounted in bearings therein, a stuffing box at the upper end of the hollow body through which the shaft passes, pistons operating in the cylinders and operatively connected to the shaft to be reciprocated thereby, a collector common to all of the cylinders, valves controlling the discharge from the cylinders into the collector, the body having an annular wall extending upward above but spaced from the stuffing box and concentric with the shaft, ducts extending from the space defined by said wall downward and outward to the outer ends of the cylinders and discharging thereinto, inwardly opening inlet valves controlling passage through said ducts, an imperforate head carried by said shaft and rotating therewith and screen means carried by the rotatable head and extending downward into close proximity to said annular wall but rotating with said head.

3. A submersible pump of the character described, including a casing constituting a base, the lower portion of the casing having an upwardly extending annular wall, an inwardly extending partition wall extending inward medially of the length of the annular wall and having a centrally disposed stuffing box, a power operated shaft extending downward through said stuffing box and into the space below said partition and having a crank, radially disposed cylinders mounted in the annular wall of the casing, pistons operating within the cylinders and connected to the crank shaft, a collector common to all of the cylinders, the cylinders having outlet ports opening into the collector, outwardly opening valves controlling communication between the collector and the cylinders, inlet ducts extending from the outer ends of the cylinders upward and inward and opening within the annular wall above the partition, inwardly opening inlet valves controlling communication between said ducts and the cylinders, and an annular screen rotatable with the shaft and extending around and in close adjacency to the upper end of the casing, the space defined between the base and the inwardly extending partition wall constituting an oil space within which the shaft operates and communicating with the inner ends of the cylinders.

WILLIAM F. KAMMER.